United States Patent
Little

(10) Patent No.: US 8,009,384 B1
(45) Date of Patent: Aug. 30, 2011

(54) CAST BASEPLATE FOR A DISK DRIVE HAVING AN ARCUATE SHROUD WALL AND ADJACENT ARCUATE GROOVE

(75) Inventor: Aaron D. Little, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 533 days.

(21) Appl. No.: 12/242,096

(22) Filed: Sep. 30, 2008

(51) Int. Cl.
*G11B 3/14* (2006.01)
(52) U.S. Cl. .................................................. 360/97.02
(58) Field of Classification Search ................ 360/97.01, 360/97.02, 97.03, 97.04
See application file for complete search history.

(56) References Cited

U.S. PATENT DOCUMENTS

| | | |
|---|---|---|
| 4,008,492 A | 2/1977 | Elsing |
| 4,581,668 A | 4/1986 | Campbell |
| 4,583,213 A | 4/1986 | Bracken et al. |
| 4,780,776 A | 10/1988 | Dushkes |
| 5,406,431 A | 4/1995 | Beecroft |
| 5,631,787 A | 5/1997 | Huang et al. |
| 5,696,649 A | 12/1997 | Boutaghou |
| 6,108,163 A * | 8/2000 | Boutaghou ................ 360/97.02 |
| 6,369,978 B1 | 4/2002 | Shimizu et al. |
| 6,507,452 B1 | 1/2003 | Bae et al. |
| 6,542,328 B2 | 4/2003 | Harrison et al. |
| 6,549,365 B1 | 4/2003 | Severson |
| 6,560,066 B2 | 5/2003 | Imai et al. |
| 6,636,379 B2 | 10/2003 | Rannow et al. |
| 6,654,201 B2 | 11/2003 | Smith |
| 6,665,139 B2 | 12/2003 | Tokuyama et al. |
| 6,728,062 B1 * | 4/2004 | Ou-Yang et al. ........... 360/97.02 |
| 6,765,751 B2 | 7/2004 | Huang et al. |
| 6,791,790 B2 * | 9/2004 | Lee ............................. 360/97.02 |
| 6,876,514 B1 | 4/2005 | Little |
| 6,894,867 B2 | 5/2005 | Hong et al. |
| 6,898,048 B2 | 5/2005 | Adams et al. |
| 6,930,856 B2 | 8/2005 | Wang et al. |
| 6,971,790 B2 | 12/2005 | Quinn et al. |
| 6,980,392 B2 | 12/2005 | Pierson |
| 6,999,273 B2 | 2/2006 | Tsang et al. |
| 7,002,774 B2 | 2/2006 | Adams |
| 7,057,850 B2 | 6/2006 | Hong et al. |
| 7,211,935 B1 | 5/2007 | Houk |
| 7,312,950 B2 | 12/2007 | Voights et al. |
| 7,353,524 B1 | 4/2008 | Lin et al. |
| 7,457,078 B2 * | 11/2008 | Fukaya et al. ............. 360/97.02 |
| 7,751,145 B1 | 7/2010 | Lin et al. |
| 2002/0135933 A1 | 9/2002 | Harrison et al. |
| 2003/0081350 A1 | 5/2003 | Wang et al. |
| 2003/0137769 A1 | 7/2003 | Wang et al. |
| 2003/0231424 A1 | 12/2003 | Hong et al. |
| 2005/0185325 A1 | 8/2005 | Hur |
| 2005/0185327 A1 | 8/2005 | Voights et al. |
| 2006/0005214 A1 * | 1/2006 | Kim et al. ..................... 720/648 |
| 2007/0097545 A1 | 5/2007 | Yoo et al. |
| 2008/0094747 A1 | 4/2008 | Chan et al. |
| 2008/0100957 A1 | 5/2008 | Gross et al. |

\* cited by examiner

*Primary Examiner* — Angel A. Castro

(57) ABSTRACT

A disk drive includes a cast baseplate, and a disk having a major surface and an outer circumference. The cast baseplate includes a casting inlet gate region, a planar area underlying the disk, an arcuate shroud wall that is substantially orthogonal to the planar area, and an arcuate groove immediately adjacent the planar area. The planar area is separated from the disk major surface by less than 0.8 mm. The arcuate shroud wall is disposed less than 0.8 mm from the disk outer circumference, and includes a first shroud wall portion and a second shroud wall portion. The first shroud wall portion is more proximate to the casting inlet gate region than is the second shroud wall portion. The arcuate groove is immediately adjacent the first shroud wall portion, and defines a groove depth in the range 0.2 mm to 2 mm relative to the planar area.

9 Claims, 5 Drawing Sheets

CAST BASEPLATE FOR A DISK DRIVE HAVING AN ARCUATE SHROUD WALL AND ADJACENT ARCUATE GROOVE

FIELD OF THE INVENTION

The present invention relates generally to information storage devices, and in particular to the casting of disk drive baseplates that have an arcuate shroud wall.

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. For example, there are so-called floppy disk drives, which store information on removable magnetic disks. There are also optical disk drives, which typically retrieve information stored on removable optical disk media. Magnetic hard disk drives typically store information on non-removable rigid magnetic disks. Also for example, there are magneto-optical disk drives, which share some of the characteristics of optical disk drives and magnetic hard disk drives.

The contemporary magnetic hard disk drive 10 that is shown in FIG. 1 includes a head disk assembly (HDA) 12 and a printed circuit board assembly (PCBA) 14. The HDA 10 includes a baseplate 16 and cover 20 that together house annular magnetic disks 22, 24. Each of the disks 22, 24 contains a plurality of magnetic tracks for storing data, disposed upon its opposing disk major surfaces. The head disk assembly 12 further includes a spindle motor 26 for rotating the disks 22, 24 about a disk axis of rotation 28. The spindle motor 26 includes a spindle motor hub that is rotatably attached to the baseplate 16 of the HDA 12. Disks 22, 24 may be stacked and separated with one or more annular disk spacers 21 that are disposed about the hub, all held fixed to the hub by a disk clamp 11.

The HDA 12 further includes a head stack assembly (HSA) 28 rotatably attached to the base plate 16 of HDA 12. The HSA 28 includes an actuator body 30 having a pivot bearing cartridge engaged within a bore for facilitating the HSA 28 to rotate relative to HDA 12 about an actuator pivot axis 46. One or more actuator arms 32 extend from the actuator body 30, and one or more head gimbal assemblies (HGA) 34 are attached to a distal end of each actuator arm 32. Each HGA includes a head (not visible in a drawing of this scale) for reading and writing data from and to a disk surface. The HSA 28 further includes a coil 50 that interacts with one or more magnets 54 that are attached to baseplate 16 via a yoke structure 56, 58, to form a voice coil motor for controllably rotating the HSA 28. HDA 12 includes a latch 52 rotatably mounted on base 16 to prevent undesired rotations of HSA 28.

The PCBA 14 includes a servo control system for generating servo control signals to control the current through the coil 50 and thereby position the HSA 28 relative to tracks disposed upon the surfaces of disks 22, 24. The HSA 28 is electrically connected to PCBA 14 via a flex cable assembly 60, which includes a flex cable and a flex cable support bracket that attaches to the base plate 16.

All types of disk drives typically include a baseplate, to which a spindle motor and head (or lens) actuator are affixed. It is known in the art that casting is a low-cost manufacturing method for fabricating the disk drive baseplate. Typically cast baseplates include regions that are subsequently machined to create registering surfaces to facilitate precise positioning of certain disk drive components relative to each other (e.g. ensuring that the disk drive spindle, actuator, and/or ramp components are positioned relative to each other at the correct Z-height).

It is also known in the art that it may be advantageous to include an arcuate shroud wall closely around the outer diameter of the disk(s), as a feature of such a baseplate, to reduce or attenuate dynamic excitation of certain disk drive components (e.g. disks, HSA). However, the closer to the disk that a designer specifies the arcuate shroud wall to be, the less manufacturing variation may be allowed in the fabrication of the baseplate.

Unfortunately, reducing variation in the baseplate manufacturing process may require the election of a higher-cost initial fabrication process than casting, and/or the need for excessive machining steps after the initial casting of the baseplate shape. Moreover, given the intense price competition and low profit margins that characterize the information storage device industry, it may be commercially impractical to select a higher cost manufacturing process for baseplate fabrication. Consequently, the benefit of tight clearance between the arcuate shroud wall and the disk(s), in inexpensive disk drives, may not be practically obtainable in a high-volume manufacturing environment with acceptable manufacturing cost and yield.

Therefore, there is a need in the art for a baseplate design and/or casting method that will practically enable tighter tolerances between a cast baseplate and a disk, with associated cost and yield that is acceptable for the high-volume manufacture of inexpensive disk drives.

SUMMARY

A disk drive is disclosed and claimed. The disk drive includes a cast baseplate, and a disk having a major surface and an outer circumference. The cast baseplate includes a casting inlet gate region, a planar area underlying the disk, an arcuate shroud wall that is substantially orthogonal to the planar area, and an arcuate groove immediately adjacent the planar area. The planar area is separated from the disk major surface by less than 0.8 mm. The arcuate shroud wall is disposed less than 0.8 mm from the disk outer circumference, and includes a first shroud wall portion and a second shroud wall portion. The first shroud wall portion is more proximate to the casting inlet gate region than is the second shroud wall portion. The arcuate groove is immediately adjacent the first shroud wall portion, and defines a groove depth in the range 0.2 mm to 2 mm relative to the planar area.

DESCRIPTION OF THE PREFERRED EMBODIMENTS

Although cast baseplates include some machined surfaces, cast baseplates have unique structural characteristics that are different from stamped or forged baseplates, and/or baseplates that have been fabricated entirely by machining. For example, one of ordinary skill can structurally distinguish cast baseplates based on tell-tale regions of substantially different surface finish (e.g. ejector pin marks, pitted or ground surfaces corresponding to injection gates, and/or mold parting lines). One of ordinary skill may also structurally distinguish cast baseplates based on draft angles on otherwise vertical surfaces that assist with mold separation.

Accordingly, the word "cast," as used herein, is an adjective describing a structural characteristic of the baseplate, rather than being used only as a process limitation. That is, a "cast baseplate" is a resulting structure that one of ordinary skill would be able to distinguish from other types of baseplates based on structure alone, without previous knowledge of the manufacturing process. The fact that a cast baseplate structure is not obtained by other fabrication methods does not remove the structural significance of "cast"; rather it just adds additional process significance.

Figure 1:
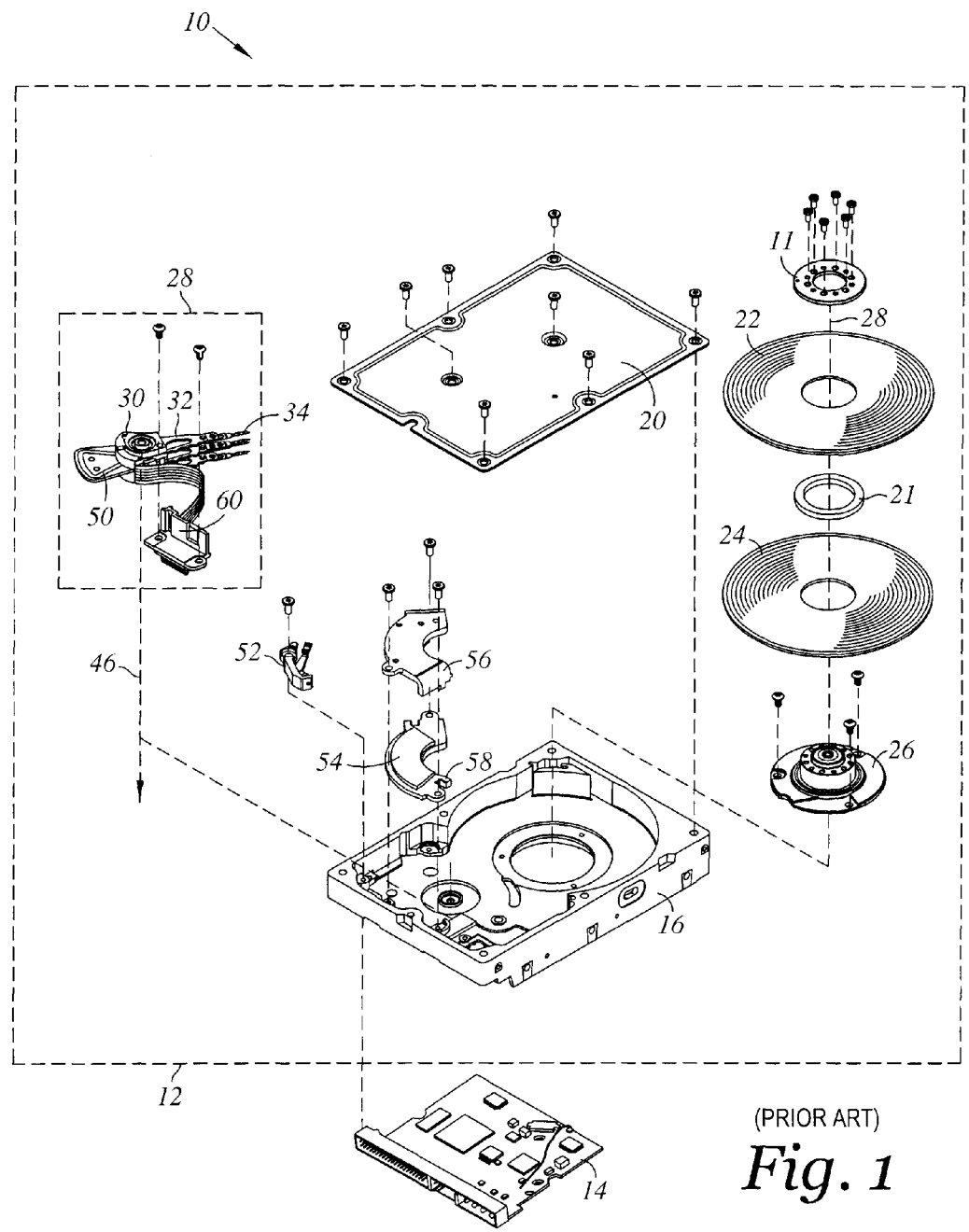
FIG. 1 is an exploded perspective view of a contemporary disk drive.
Figure 2:
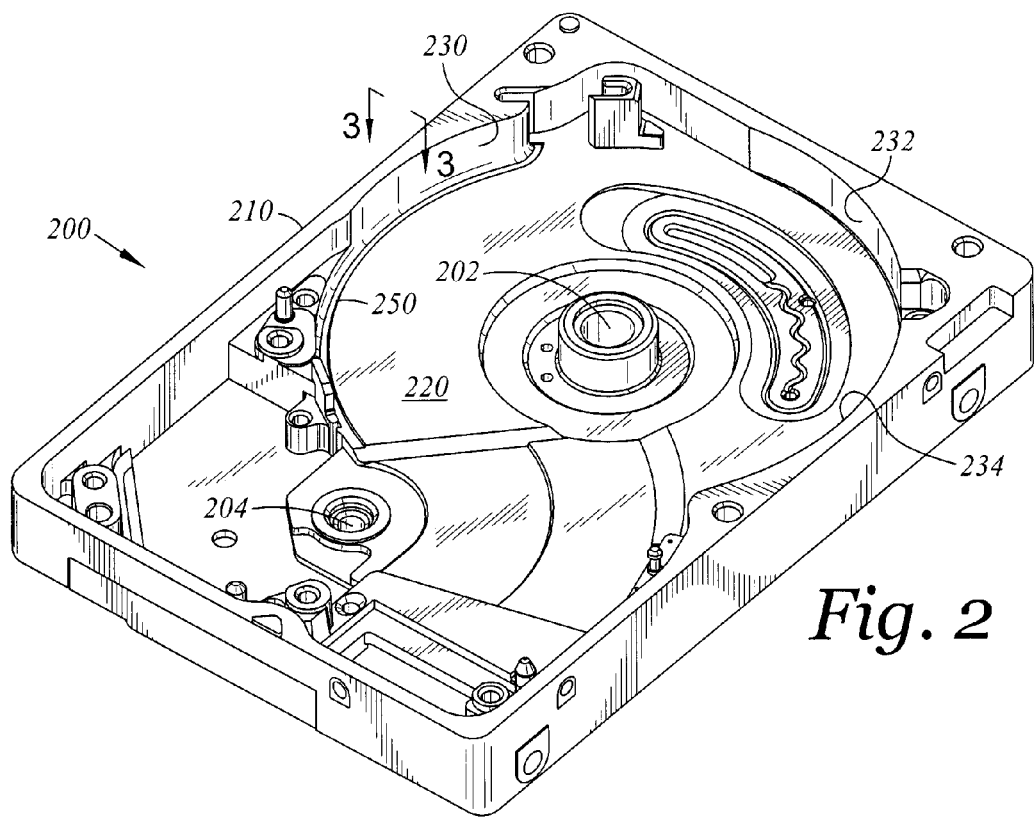
FIG. 2 is a perspective view of a disk drive baseplate according to an embodiment of the present invention.

FIG. 2 is a perspective view of a disk drive baseplate 200 according to an embodiment of the present invention. The baseplate 200 includes a mounting location 202 for a disk spindle, a mounting location 204 for a head actuator, and a casting inlet gate region 210 through which molten metal (e.g. aluminum) flows into the mold that creates the shape of the baseplate. More specifically, the inlet gate region 210 is a structural consequence of a recession in the casting mold (preferably along the parting line where the casting mold separates into halves) through which molten material flows into the casting mold. The inlet gate region 210 is recognizable as a ground or pitted surface having a surface finish that is substantially different from adjacent regions of the baseplate 200, and having substantially greater breadth than elsewhere along the parting line. For example, the surface finish of the inlet gate region 210 is "substantially different" if one of ordinary skill would readily measure or recognize a difference in pitting or surface roughness associated with earlier separation (e.g. by deliberate fracture and/or grinding) of the baseplate 200 from material that solidified in the casting inlet gate region 210.

In the embodiment of FIG. 2, the baseplate 200 also includes a planar area 220 that underlies the disk(s) and, after assembly, is separated from a major surface of the lowermost disk by less than 0.8 mm. The baseplate 200 also includes an arcuate shroud wall having a first shroud wall portion 230, a second shroud wall portion 232, and a third shroud wall portion 234. In the embodiment of FIG. 2, all of the three portions of the arcuate shroud wall are substantially orthogonal to the planar area 220 and (after disk drive assembly) are disposed less than 0.8 mm from the disk outer circumference.

Although it may be functionally desirable for the arcuate shroud wall to be perfectly orthogonal to (i.e. at a 90° angle with) the planar area 220, in a cast baseplate the angle between these surfaces preferably differs from 90° by a draft angle in the range 1 to 3 degrees. The reason why a cast baseplate preferably has this feature, is to facilitate the release of the solidified baseplate from the casting mold. Specifically, the draft angle may facilitate separation of the casting mold halves by ensuring that interior corners (in vertical cross-sections) are not less than 90°. Therefore, the phrase "substantially orthogonal," as used herein, contemplates and includes the possibility of a draft angle difference from perfect orthogonality.

In the embodiment of FIG. 2, the first shroud wall portion 230 is more proximate to the casting inlet gate region 210 than is the second shroud wall portion 232 or the third shroud wall portion 234. Consequently, the molten metal that flows through the inlet gate region will tend to wear the features of the mold (e.g. edges) that create the shape of the first shroud wall portion 230 more quickly than such molten metal may wear the features of the mold that create the second shroud wall portion 232 or the third shroud wall portion 234. Then, as the edges of the mold features that create the first shroud wall portion continue to wear with repeated use of the casting mold, the arcuate interior corner between the first shroud wall portion 230 and the planar area 220 may become excessively filled with solidified metal that forms a fillet or radius. Such fillet metal may reduce the clearance between the first shroud wall portion 230 and the disk to be less than that intended by design.

If no practical solution to this manufacturing concern is implemented, then as the casting mold is repeatedly used, the solidified fillet and radius metal will ultimately become excessive due to mold wear, leading to unacceptable interference between the first shroud wall portion 230 and the disk. Such unacceptable interference may occur even while the other portions of the casting mold (e.g. those that create the second and third shroud wall portions) are still serviceable and not excessively worn. As the intended clearance between the arcuate shroud wall and the disk is reduced by design, the undesired or unacceptable consequences of casting mold wear are more severe and occur earlier in the life of the casting mold.

Surprisingly, this downstream manufacturing concern may be practically and inexpensively mitigated by a subtle change to the initial design of the baseplate. Specifically, in the embodiment of FIG. 2, an arcuate groove 250 is disposed between the planar area 220 and the first shroud wall portion 230, immediately adjacent the planar area 220, and immediately adjacent the first shroud wall portion 230. The arcuate groove 250 is very shallow relative to the depth that would be necessary to significantly affect the air flow induced by disk rotation, but that is acceptable since affecting the air flow is not its purpose. Rather, the presence of the arcuate groove 250 implies the presence of a raised bump or ridge on a corresponding external corner of the casting mold that created the shape of the baseplate 200. This raised bump or ridge in the casting mold acts as a sacrificial wear region to delay the wearing of the corresponding external corner itself.

Given the purpose of the arcuate groove 250, it is not necessary in locations that are relatively far away from the inlet casting gate region 210. For example, in the embodiment of FIG. 2, the arcuate groove 250 is present adjacent the first shroud wall portion 230, but not present adjacent the second shroud wall portion 232 or the third shroud wall portion 234.

Figure 3A:
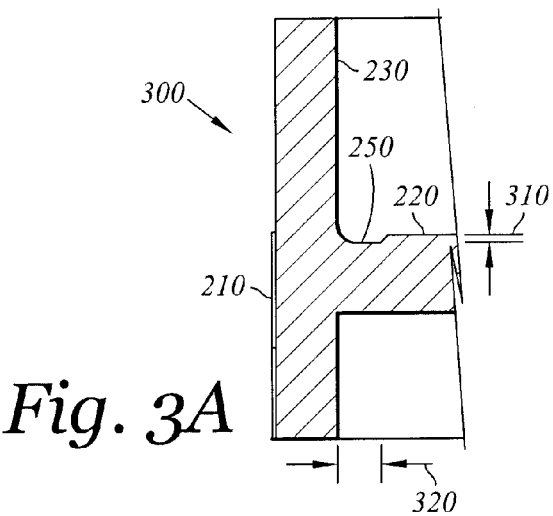
FIG. 3A is a side cross-sectional view of a baseplate, depicting a cross-section of an arcuate shroud wall and immediately adjacent arcuate groove, according to an embodiment of the present invention.

FIG. 3A is a side cross-sectional view of a baseplate 300, depicting a cross-section of an arcuate shroud wall and immediately adjacent arcuate groove 250, according to an embodiment of the present invention. For example, the cross-section of FIG. 3A may be taken at a baseplate location such as location 3 that is indicated by arrows in FIG. 2 (depending on the baseplate design). The baseplate 300 shown in FIG. 3A includes an inlet gate region 210 and a first shroud wall portion 230. In the embodiment of FIG. 3A, the arcuate groove 250 preferably defines a groove depth 310 in the range 0.2 mm to 2 mm relative to a planar area 220, and a groove width 320 in the range 0.8 mm to 3 mm, measured parallel to the planar area 220.

Figure 3B:
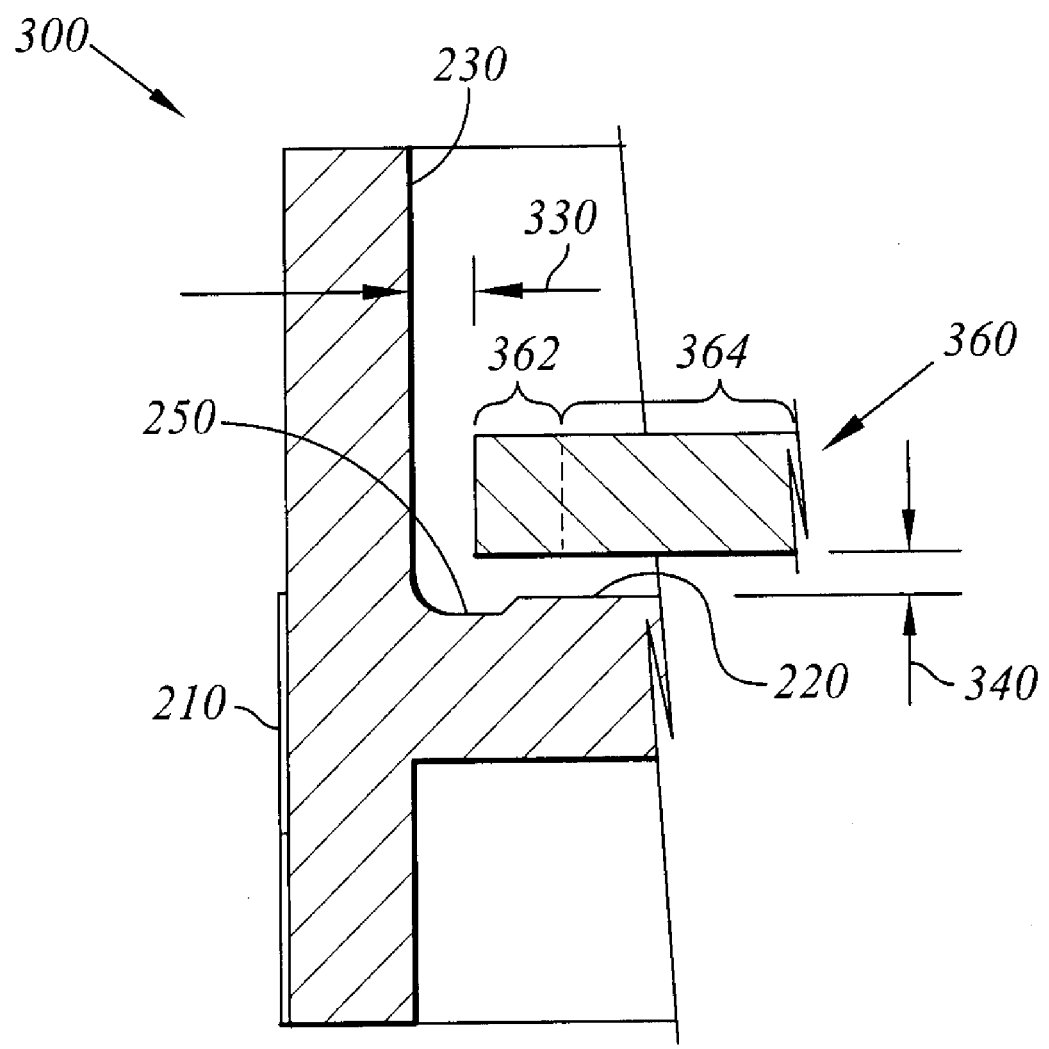
FIG. 3B is a side cross-sectional view of a baseplate, similar to FIG. 3A except additionally depicting a disk that is proximate to the baseplate, according to an embodiment of the present invention.

FIG. 3B is a side cross-sectional view similar to FIG. 3A, except additionally depicting a disk that is proximate to the baseplate 300, according to an embodiment of the present invention. Specifically, a disk 360 is depicted in FIG. 3B to be the disk most proximate to the baseplate 300. The disk 360 has a radial clearance 330 from a first shroud wall portion 230 of the baseplate 300, and a vertical clearance 340 from a planar area 220 of the baseplate 300. The clearances 330 and 340 are preferably each less than 0.8 mm.

The disk 360 includes top and bottom major disk surfaces upon which data may be written. In the embodiment of FIG. 3B, each of the top and bottom major disk surfaces includes an annular written region that contains data (e.g. annular written region 364 of the top major disk surface), and an annular unwritten region adjacent the disk outer circumference that does not contain data (e.g. annular unwritten region 362 of the top major disk surface). In the embodiment of FIG. 3B, the bottom major surface of disk 360 also has similar annular written and unwritten regions having the same radial extents, but these regions are not labeled to avoid clutter of FIG. 3B.

In the embodiment of FIGS. 3A and 3B, the annular unwritten region 362 defines an unwritten region radial extent that exceeds the groove width 320 less the radial clearance 330. That is, the radial clearance 330 plus the radial extent of the annular unwritten region 362, is greater than the groove width 320. Because the annular written and unwritten regions of the top and bottom major disk surfaces preferably have the same radial extent, the aforementioned inequality may help protect the data written on the bottom major surface from loss due to contact between the disk 360 and the edge of the groove 250 during assembly and/or a mechanical shock event.

Figure 4:
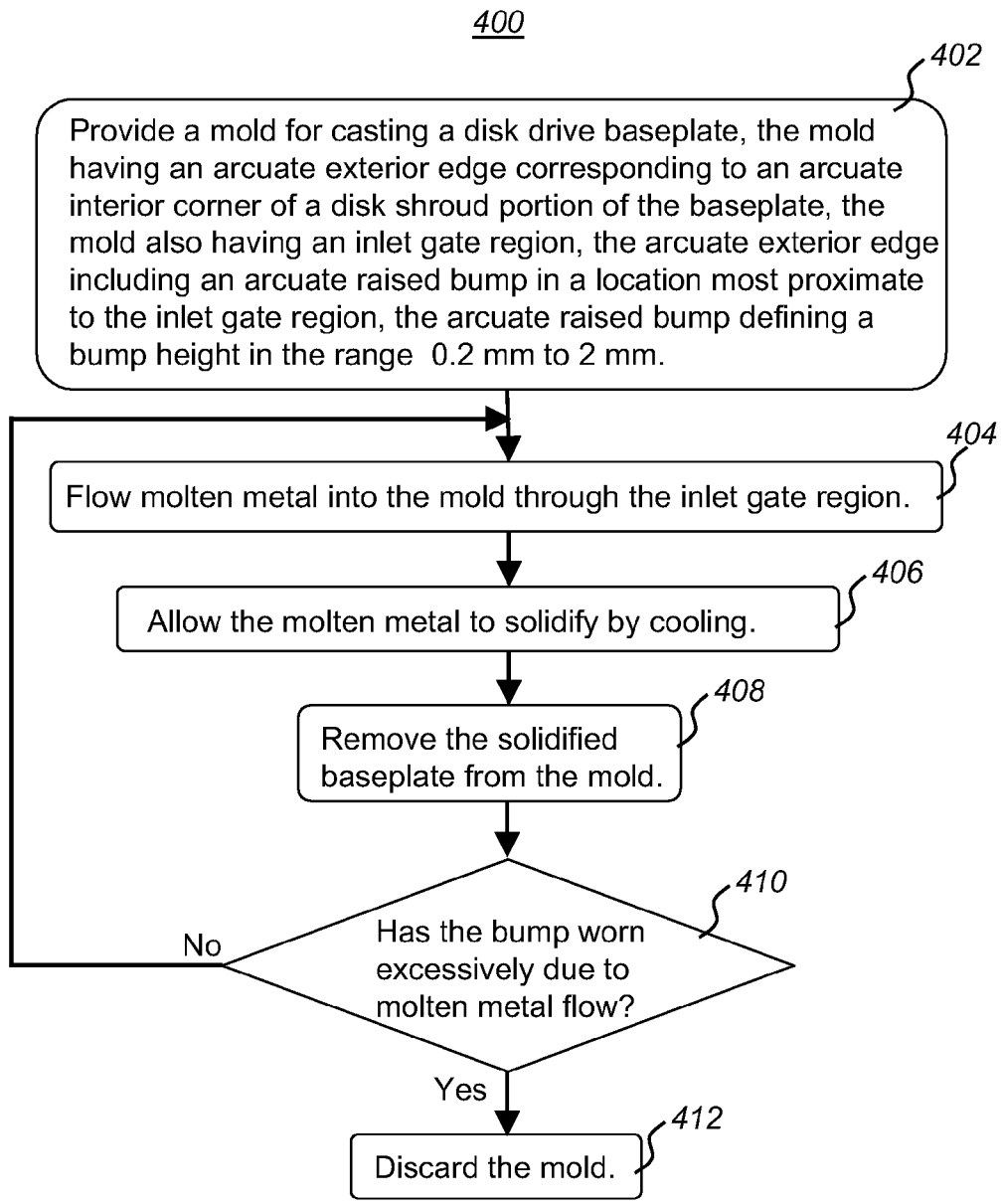
FIG. 4 is a flow chart of a method to cast disk drive baseplates, according to an embodiment of the present invention.

FIG. 4 depicts a flow chart of a method 400 to cast disk drive baseplates, according to an embodiment of the present invention. In step 402, a mold is provided for casting a disk drive baseplate. The mold has an arcuate exterior edge corresponding to an arcuate interior corner of a disk shroud portion of the baseplate. The mold also has an inlet gate region. The arcuate exterior edge of the casting mold has an arcuate raised bump in a location most proximate to the inlet gate region. The arcuate raised bump defines a bump height in the range 0.2 mm to 2 mm. Note that the arcuate raised bump will cause a corresponding groove (e.g. groove 250 of FIG. 2) in the baseplate that is cast using the casting mold.

Still referring to FIG. 4, in step 404 molten metal is flowed into the casting mold through the inlet gate region. In step 406, the molten metal is allowed to solidify by cooling, and then the solidified baseplate is removed from the casting mold in step 408. Next, in step 410, it is determined whether the bump has worn excessively due to molten metal flow. For example, it may be determined that the bump has worn excessively if, for example, referring to the baseplate embodiment of FIG. 2, the arcuate interior corner between the first shroud wall portion 230 and the planar area 220 becomes excessively filled with solidified metal that forms too large a fillet or interior radius. If the bump has worn excessively, then the casting mold is discarded in step 412 of the method depicted in FIG. 4. Otherwise, the casting mold is re-used (as indicated by the upward arrow at the left side of the flow chart of FIG. 4).

Figure 5:
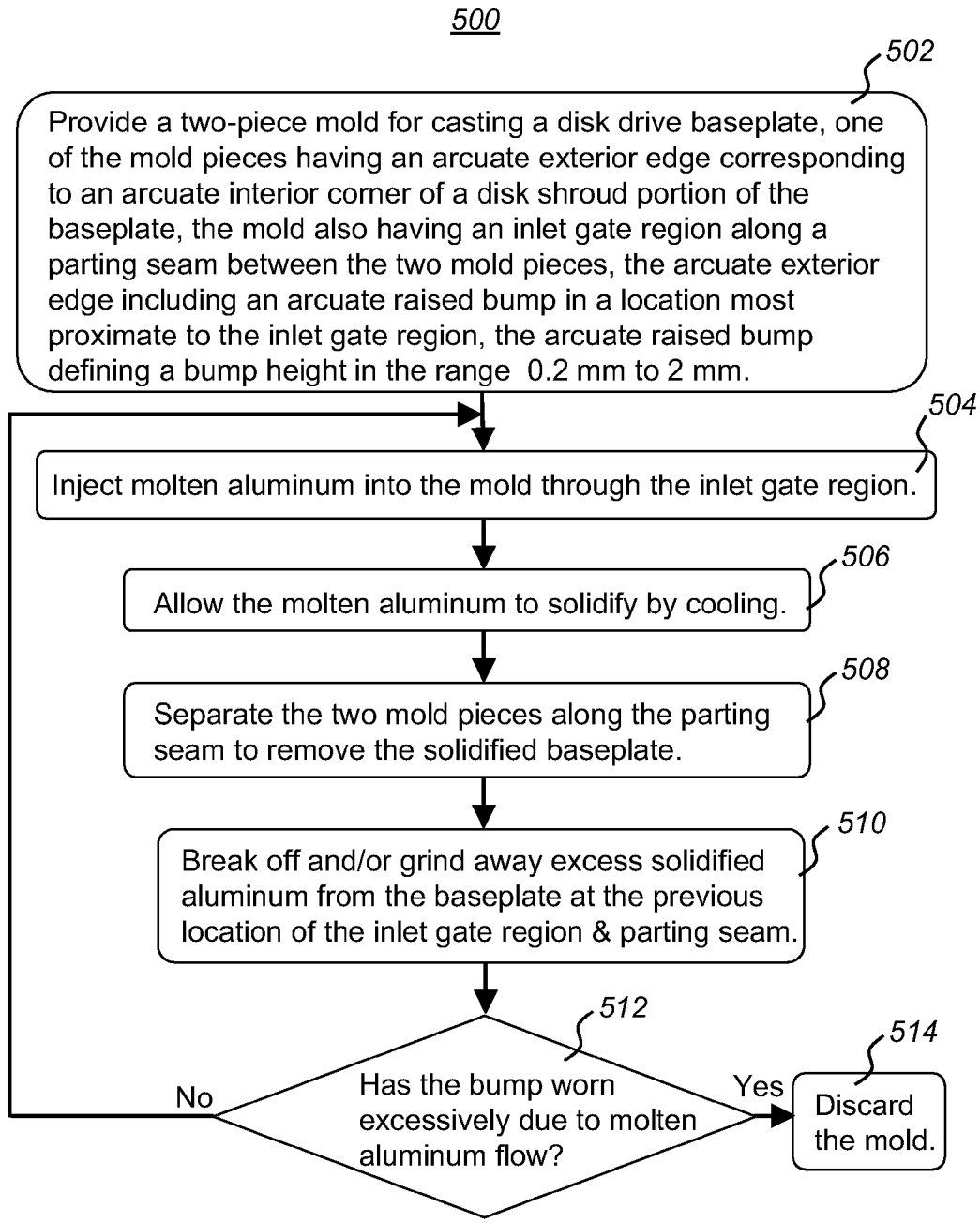
FIG. 5 is a flow chart of a method to cast disk drive baseplates, according to another embodiment of the present invention.

FIG. 5 depicts a flow chart 500 of a method to cast disk drive baseplates, according to another embodiment of the present invention. In step 502, a two-piece mold is provided for casting a disk drive baseplate. One of the casting mold pieces has an arcuate exterior edge corresponding to an arcuate interior corner of a disk shroud portion of the baseplate. The casting mold also has an inlet gate region along a parting seam between the two mold pieces. The arcuate exterior edge includes an arcuate raised bump in a location most proximate to the inlet gate region. The arcuate raised bump defines a bump height in the range 0.2 mm to 2 mm. Note that the arcuate raised bump will cause a corresponding groove (e.g. groove 250 of FIG. 2) in the baseplate that is cast using the casting mold.

Still referring to FIG. 5, in step 504, molten aluminum is injected into the casting mold through the inlet gate region. In step 506, the molten aluminum is allowed to solidify by cooling. Next, in step 508, the two casting mold pieces are separated along the parting seam to remove the solidified baseplate. In step 510, the excess solidified aluminum is broken off and/or ground away from the baseplate at the previous location of the inlet gate region & parting seam.

Next, in step 512, it is determined whether the bump has worn excessively due to molten aluminum flow. For example, it may be determined that the bump has worn excessively if, for example, referring to the baseplate embodiment of FIG. 2, the arcuate interior corner between the first shroud wall portion 230 and the planar area 220 becomes excessively filled with solidified metal that forms too large a fillet or interior radius. If the bump has worn excessively, then the casting mold is discarded in step 514 of the method depicted in FIG. 5. Otherwise, the casting mold is re-used (as indicated by the upward arrow at the left side of the flow chart of FIG. 5).

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," "with," and "having," as used herein, are intended to be read as open-ended terms.

I claim:

1. A disk drive comprising:
   a disk having a disk major surface and a disk outer circumference;
   a cast baseplate including
      a casting inlet gate region;
      a planar area underlying the disk and separated from the disk major surface by less than 0.8 mm;
      an arcuate shroud wall that is substantially orthogonal to the planar area and disposed less than 0.8 mm from the disk outer circumference, the arcuate shroud wall including a first shroud wall portion and a second shroud wall portion, the first shroud wall portion being more proximate to the casting inlet gate region than is the second shroud wall portion;
      an arcuate groove immediately adjacent the planar area and immediately adjacent the first shroud wall portion, the arcuate groove defining a groove depth in the range 0.2 mm to 2 mm relative to the planar area.

2. The disk drive of claim 1 wherein the arcuate groove is disposed between the planar area and the first shroud wall portion.

3. The disk drive of claim 1 wherein the arcuate groove defines a groove width in the range 0.8 mm to 3 mm, measured parallel to the planar area.

4. The disk drive of claim 3 wherein the first shroud wall portion is separated from the disk outer circumference by a radial clearance less than 0.8 mm, wherein the disk major surface includes an annular written region that contains data, wherein the disk major surface includes an annular unwritten region adjacent the disk outer circumference that does not contain data.

5. The disk drive of claim 4 wherein the annular unwritten region defines an unwritten region radial extent, and wherein the radial clearance plus the annular unwritten region radial extent is greater than the groove width.

6. The disk drive of claim 1 wherein the cast baseplate comprises aluminum.

7. The disk drive of claim 1 wherein a surface finish of the casting inlet gate region is substantially different from a surface finish of the planar area.

8. The disk drive of claim 1 wherein the arcuate shroud wall is disposed at an angle relative to the planar area that is different from 90° by a draft angle in the range 1 to 3 degrees.

9. The disk drive of claim 1 further comprising a parting line region, and wherein a surface finish of the parting line region is substantially different from a surface finish of the planar area.

* * * * *